(12) United States Patent
Baker et al.

(10) Patent No.: US 6,910,168 B2
(45) Date of Patent: Jun. 21, 2005

(54) RADIO COMMUNICATION SYSTEM

(75) Inventors: Matthew P.J. Baker, Canterbury (GB); Timothy J. Moulsley, Caterham (GB); Bernard Hunt, Redhill (GB)

(73) Assignee: Koninklijke Philips Electronics. N.V., Eindhoven (NL)

( * ) Notice: Subject to any disclaimer, the term of this patent is extended or adjusted under 35 U.S.C. 154(b) by 479 days.

(21) Appl. No.: 10/084,735

(22) Filed: Feb. 25, 2002

(65) Prior Publication Data

US 2002/0119778 A1 Aug. 29, 2002

(30) Foreign Application Priority Data

Feb. 27, 2001 (GB) .............................................. 0104830

(51) Int. Cl.$^7$ ........................... H03M 13/00; H04L 1/18
(52) U.S. Cl. ...................................................... 714/751
(58) Field of Search ......................... 714/751; 370/331, 370/329; 455/436, 437, 738

(56) References Cited

U.S. PATENT DOCUMENTS

| | | | | |
|---|---|---|---|---|
| 5,042,082 A | * | 8/1991 | Dahlin ........................ | 455/437 |
| 6,570,860 B2 | * | 5/2003 | Hamalainen et al. ....... | 370/329 |
| 6,628,631 B1 | * | 9/2003 | Mazawa et al. ............ | 370/331 |
| 6,678,523 B1 | * | 1/2004 | Ghosh et al. ............... | 455/442 |

FOREIGN PATENT DOCUMENTS

| | | | | |
|---|---|---|---|---|
| WO | WO9723110 | 6/1997 | ............ | H04Q/7/38 |
| WO | WO0049760 | 8/2000 | ............. | H04L/1/12 |

OTHER PUBLICATIONS

GB 010022 filed on Jan. 11, 2002, U.S. Appl. No.: 10/043,532, Entitled: Radio Communication System Inventors: Matthew P.J. Baker et al.

* cited by examiner

Primary Examiner—Joseph D. Torres
(74) Attorney, Agent, or Firm—Dicran Halajian

(57) ABSTRACT

A radio communication system includes a primary station which is arranged to transmit a series of data packets to a secondary station which operates according to an ARQ scheme for acknowledging correct reception of each packet. The primary station transmits error correction information relating to any packets that are not received correctly, thereby enabling the secondary station to extract correctly the data. The data packets are transmitted via a plurality of logical channels, so that an error in transmission of one packet does not hold up transmission of packets in other channels. Transfer of data transmission from one primary station to another is done by transferring each channel when correct reception of a data packet on that channel has been acknowledged, thereby avoiding the extra signaling required in transferring logical channels in which a data packet has been received in error and the error correction transmissions have not been completed.

9 Claims, 2 Drawing Sheets

RADIO COMMUNICATION SYSTEM

The present invention relates to a radio communication system and further relates to primary and secondary stations for use in such a system and to a method of operating such a system. While the present specification describes a system with particular reference to the Universal Mobile Telecommunication System (UMTS), it is to be understood that such techniques are equally applicable to use in other mobile radio systems.

There is a growing demand in the mobile communication area for a system having the ability to download large blocks of data to a Mobile Station (MS) on demand at a reasonable rate. Such data could for example be web pages from the Internet, possibly including video clips or similar. Typically a particular MS will only require such data intermittently, so fixed bandwidth dedicated links are not appropriate. To meet this requirement in UMTS, a High-Speed Downlink Packet Access (HSDPA) scheme is being developed which may facilitate transfer of packet data to a mobile station at up to 4 Mbps.

In known radio communication systems, at any one time a MS generally communicates with a single Base Station (BS). During the course of a call the MS may wish to investigate transferring to another BS, for example when the quality of the communication link deteriorates as the MS moves away from its BS, or when the relative traffic loading of different cells requires adjusting. The process of transferring from one BS to another is known as handover.

In a system operating according to the current UMTS specifications, the MS maintains a list of BSs known as the "active set" with which it is expected that radio links of reasonable quality can be maintained. When the MS is in dedicated channel mode, and there are multiple BSs in the active set, the MS is in "soft handover" with the BSs in the active set. In this mode uplink transmissions are received by all BSs in the active set, and all BSs in the active set transmit substantially the same downlink information to the MS (typically the data and most of the control information would be the same, but power control commands could be different). A drawback of this "soft handover" approach is that the uplink and downlink transmission powers cannot be optimised for each individual radio link, as only one set of power control commands is transmitted in the uplink, while the power control commands transmitted over the downlink from different BSs may result in conflicting requirements for the uplink transmission power.

The normal soft handover procedure is particularly suitable for real time services such as voice links, where a continuous connection must be maintained. For packet data links, however, it can be advantageous to select the optimum BS for the transmission of each data packet to a MS, to allow for dynamically changing radio link and traffic conditions. Such possibilities are envisaged for a UMTS HSDPA system. The process of selecting a BS for transmission of subsequent data is known as site selection, and would normally be made on the basis of measurements of radio channel quality and/or considerations of system load. The selection can be made by the MS, the BS, or some combination of the two. Our co-pending unpublished United Kingdom patent application, 0104610.1 (Applicant's reference PHGB 010027), gives details of how such a site selection mechanism could be implemented.

Proposed embodiments of HSDPA use an ARQ (Automatic Repeat reQuest) scheme to ensure correct delivery of each data packet, since accurate data transmission is viewed as more important than the reduced system throughput under poor channel conditions (due to multiple re-transmissions). One proposed HSDPA scheme employs an n-channel stop-and-wait ARQ. According to such a scheme, up to n packets may be transmitted before any are positively acknowledged. This increases throughput and has the advantage over conventional stop-and-wait ARQ schemes that if one packet is not received correctly, further packets may continue to be sent on the other channels in parallel with the retransmissions of the packet received with errors.

However, if it is required to minimise the amount of status information which has to be communicated between BSs (which is generally thought to be desirable), transfer of a downlink packet channel from one BS to another in response to site selection can only take place after a packet has been correctly received and acknowledged and not while awaiting retransmissions. This is particularly relevant in the case of ARQ using incremental redundancy, where retransmissions relating to a packet are not identical to the originally transmitted packet but include additional redundant information. If such a scheme is being used, significant additional status information would need to be transferred between BSs if the transmission of a packet which had not been positively acknowledged were to be transferred to another BS.

In one proposed n-channel ARQ scheme, all packets to a particular MS are transmitted from a particular BS until such time as transmission of packets to that MS is switched to another BS. In networks with large numbers of MSs requiring high-speed downlink packet transmission, the requirement to transfer the complete state of an n-channel transmission from one BS to another can result in scheduling difficulties in the network and excessive signalling traffic.

An object of the present invention is to address the above problem.

According to a first aspect of the present invention there is provided a radio communication system comprising a primary station having means for transmitting a series of data packets to a secondary station, wherein the secondary station has means for determining whether each packet is received correctly and means for signalling this determination to the primary station, and the primary station has means for transmitting error correction information relating to a data packet which the secondary station has not received correctly to assist the secondary station in decoding that packet, means for transmitting the series of data packets via a plurality of logical channels, thereby enabling continued transmission of data packets on at least one channel while error correction information is transmitted on another channel, and handover means for transferring transmission of at least two of the logical channels to another primary station, wherein the handover means comprises means for transferring each of the at least two logical channels individually to another primary station in response to receiving acknowledgement of successful reception of the most recently-transmitted packet on that logical channel, regardless of the status of the other logical channels.

By enabling the data channels to be transferred one at a time, the extra signalling which would be required to transfer a logical channel which is in the process of having error correction information transmitted is eliminated, thereby improving system performance. The error correction information may comprise retransmission of the data packet or the use of an incremental redundancy scheme. The logical channels need not all be transferred to the same primary station.

According to a second aspect of the present invention there is provided a primary station having means for transmitting a series of data packets to a secondary station, means for determining from signals transmitted by the secondary station whether each packet is received correctly, means for transmitting error correction information relating to a data packet which the secondary station has not received correctly to assist the secondary station in decoding that packet, means for transmitting the series of data packets via a plurality of logical channels, thereby enabling continued transmission of data packets on at least one channel while error correction information is transmitted on another channel, and handover means for transferring transmission of at least two of the logical channels to another primary station, wherein the handover means comprises means for transferring each of the at least two logical channels individually to another primary station in response to receiving acknowledgement of successful reception of the most recently-transmitted packet on that logical channel, regardless of the status of the other logical channels.

According to a third aspect of the present invention there is provided a secondary station having means for receiving a series of data packets from a primary station, means for determining whether each packet is received correctly and means for signalling this determination to the primary station, means for receiving from the primary station error correction information relating to a data packet which the secondary station has not received correctly to assist the secondary station in decoding that packet, means for receiving the series of data packets via a plurality of logical channels, thereby enabling continued reception of data packets on at least one channel while error correction information is transmitted on another channel, and handover means for starting to receive at least two of the logical channels from another primary station, each of the at least two channels being transferred from the primary station to another primary station in response to acknowledgement by the secondary station of successful reception of the most recently-transmitted packet on the respective logical channel, regardless of the status of the other logical channels.

According to a fourth aspect of the present invention there is provided a method of operating a radio communication system comprising a primary station arranged to transmit a series of data packets to a secondary station, the method comprising the secondary station determining whether each packet is received correctly and signalling this determination to the primary station, and the primary station transmitting error correction information relating to a data packet which the secondary station has not received correctly to assist the secondary station in decoding that packet, transmitting the series of data packets via a plurality of logical channels, thereby enabling continued transmission of data packets on at least one channel while error correction information is transmitted on another channel, and being able to transfer transmission of at least two of the logical channels to another primary station, wherein each of the at least two logical channels may be transferred individually to another primary station in response to receiving acknowledgement of successful reception of the most recently-transmitted packet on that logical channel, regardless of the status of the other logical channels.

The present invention is based upon the recognition, not present in the prior art, that enabling transfer of each channel of an n-channel data transmission from one BS to another in a channel-by-channel manner improves system operation.

Embodiments of the present invention will now be described, by way of example, with reference to the accompanying drawings, wherein.

In the drawings the same reference numerals have been used to indicate corresponding features.

Figure 1:
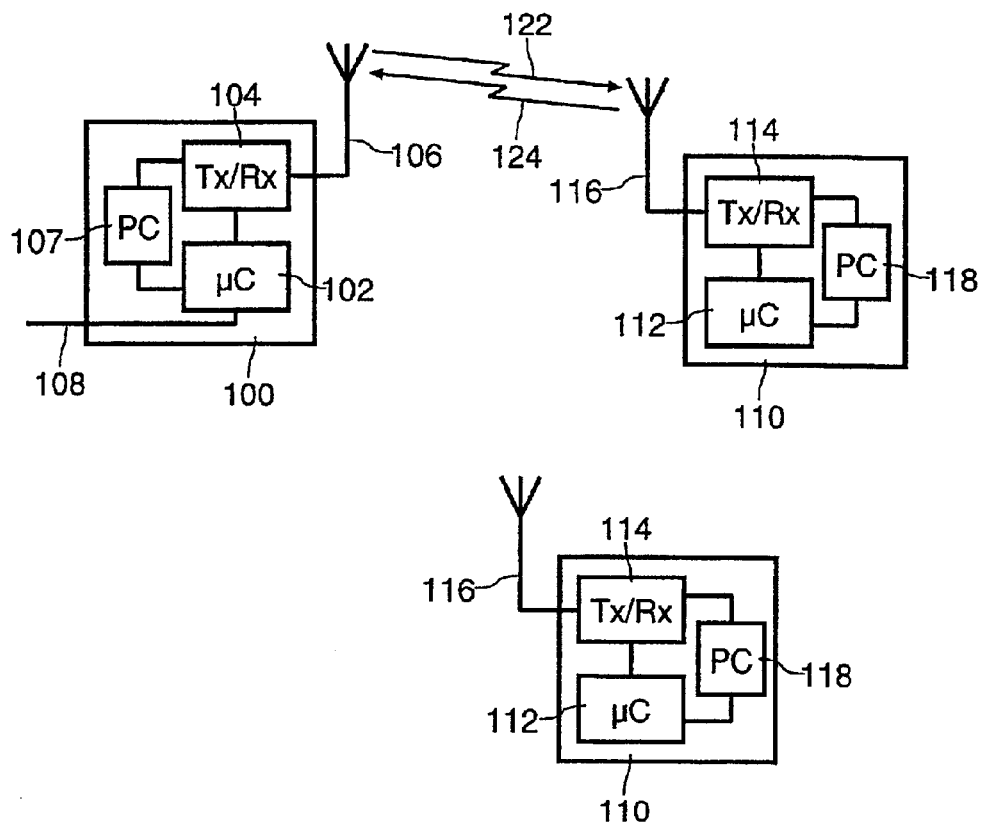
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller ($\mu$C) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller ($\mu$C) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
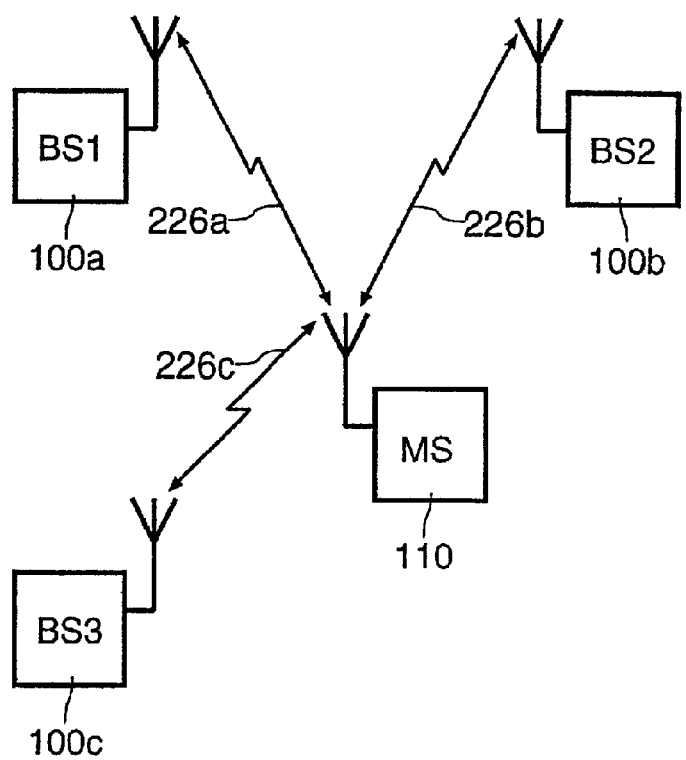
FIG. 2 is a block schematic diagram of a HSDPA system in which a secondary station can select which of a plurality of primary stations transmits the data.

A MS 110 operating in a HSDPA system is illustrated in FIG. 2, the MS 110 having three two-way communication channels 226a, 226b, 226c, each comprising an uplink and a downlink channel, with three respective BSs 100a, 100b, 100c. At any given time the MS 110 receives data packets from one of the BSs 100a, 100b, 100c on a respective downlink channel 226a, 226b, 226c. Site selection is enabled by the MS 110 selecting which of the BSs 100a, 100b, 100c it wishes to transmit subsequent data packets. Operation of such a system can be improved by combining site selection and ARQ messages in a single code word, as disclosed in our co-pending unpublished United Kingdom patent application 0111407.3 (Applicant's reference PHGB010069). Operation of such a system is also improved by the MS 110 operating parallel power control loops with each of the BSs 100a, 100b, 100c, as disclosed in our co-pending unpublished United Kingdom patent application 0103716.7 (Applicant's reference PHGB010022), which facilitates selection of the best BS on a per-packet basis.

Figure 3:
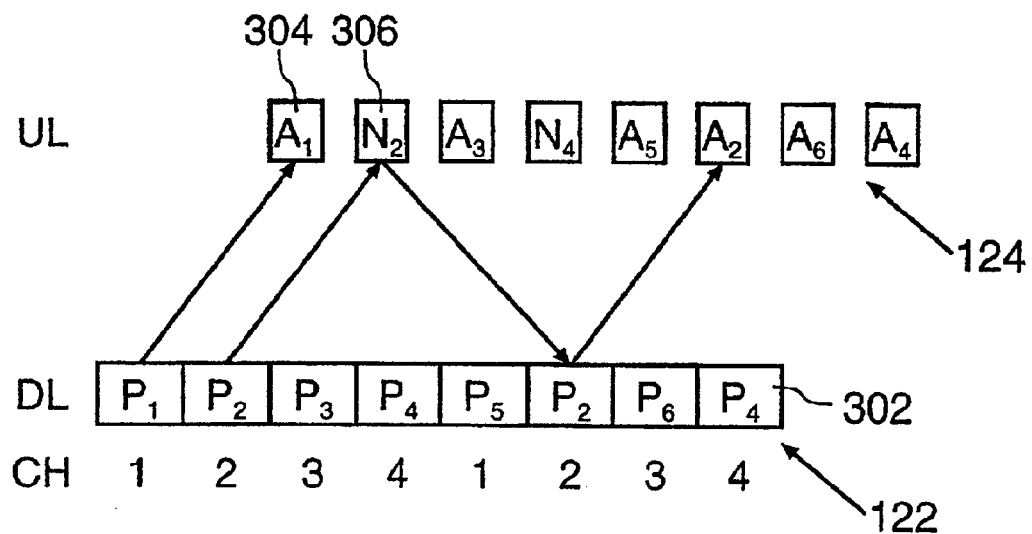
FIG. 3 is a diagram illustrating operation of a known n-channel ARQ scheme for HSDPA.

An example of a 4-channel ARQ scheme operating in known manner is illustrated in FIG. 3. Data packets 302, identified as $P_n$ where n is a sequence number, are transmitted in sequence on a downlink channel (DL) 122 from a BS 100 to a MS 110. Each packet 302 is assigned to a logical channel (CH) in turn, starting with the first packet. Hence, packet $P_1$ is assigned to channel 1, packet $P_2$ to channel 2 and so on. ARQ is performed separately for each channel.

In the illustrated scenario, the first data packet $P_1$ is sent via the first logical channel and is received correctly by the MS 110, which transmits an acknowledgement ($A_1$) 304 on an uplink channel 124. Hence, when channel 1 is next scheduled for transmission, the next packet awaiting transmission, $P_5$ is selected and transmitted to the MS 110. Similarly, the second data packet $P_2$ is sent via the second logical channel. However, this packet is not received correctly by the MS 110, which issues a negative acknowledgement ($N_2$) 306. Hence, when channel 2 is next scheduled for transmission, packet $P_2$ is transmitted again. This time it is correctly received, and an acknowledgement 304 is issued on the uplink channel 124, thereby freeing channel 2 to transmit further packets 302.

Such a scheme can provide improved throughput compared with a single channel ARQ scheme, since incorrect reception of one data packet 302 does not prevent further data packets being transmitted on other logical channels. However, the scheme can present problems in a system in which the BS 100 transmitting the data packets can be changed at short notice depending on radio channel conditions. In particular, significant signalling between BSs 100*a*, 100*b*, 100*c* may be required to indicate both the last successfully transmitted packet 302 together with information relating to packets 302 not yet successfully transmitted and their respective logical channels. This is especially the case if incremental redundancy is used, in which case the exact state of transmission of each failed packet 302 needs to be signalled. If the system is able to change transmitting BS 100*a*, 100*b*, 100*c* every few packets, as may be considered a preferred option, the signalling traffic may comprise a significant fraction of the data traffic.

Figure 4:
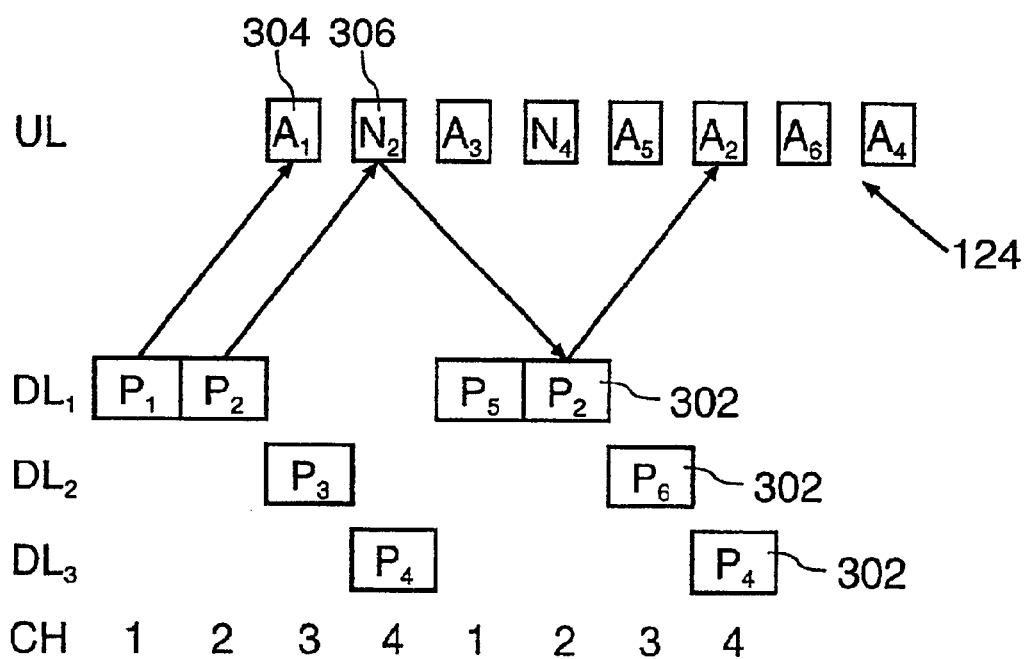
FIG. 4 is a diagram illustrating operation of an n-channel ARQ scheme in accordance with the present invention.

This problem is addressed in a system made in accordance with the present invention by enabling each of the logical channels to be transmitted by a different BS 100*a*, 100*b*, 100*c*. FIG. 4 illustrates operation of such a scheme, with four logical channels and three BSs 100*a*, 100*b*, 100*c*. The first BS 100*a* transmits logical channels 1 and 2 over a first downlink channel $DL_1$, the second BS 100*b* transmits logical channel 3 over a second downlink channel $DL_2$ and the third BS 100*c* transmits logical channel 4 over a third downlink channel $DL_3$. In such a system, transfer of packet transmission from one BS 100*a*, 100*b*, 100*c* to another is simplified because each logical channel can be transferred when its most recently-transmitted packet 302 has been correctly received. In other words, this can result in retransmissions from the first BS 100*a* being transmitted to the MS 110 on one logical channel in parallel with transmissions of new packets from the second BS 100*b* on different logical channels to the same MS 110.

Furthermore, in a system made in accordance with the present invention it is not necessary to transfer all channels to the new BS even when the most recent packet has been positively acknowledged, but different channels can continue to be transmitted from different BSs for example in order to make use of available capacity at different BSs where one BS may not have enough capacity to carry the entirety of the packet traffic to a particular MS. The site selection process could even be made to operate for groups of one or more logical channels instead of the complete set of logical channels.

As illustrated in FIG. 4, the logical channels are time-multiplexed so as to appear effectively as a single data stream at the MS 110. However, other methods of transmitting in parallel may be used as alternatives (or in combination with time-multiplexing or with each other), including for example frequency-, code- and space-multiplexed. In the case of space-multiplexing, a directional antenna pattern could be used at the MS 110, with different lobes being used for the different ARQ channels.

In one embodiment, the mapping of packets to particular BSs 100*a*, 100*b*, 100*c* may be carried out according to the traffic loading of different BSs. The packet rate from each BS might be proportional to their spare capacity.

In another embodiment, the mapping of packets to particular BSs may be carried out according to the differing QoS (Quality of Service) requirements of different packets. Different QoS requirements may be due to the packets being destined for different applications running on the MS 110. Alternatively, packets with different QoS requirements could result from the same application, for example in the case of a speech codec outputting different classes of bits depending on their importance. Packets of data requiring a low BER (Bit Error Rate) or a low transmission delay would be transmitted from BSs with the shortest packet queues and/or the best quality links to the MS 110.

The present invention gives greater flexibility for scheduling packets in the network and for mapping the traffic to the available air interface resources.

Although the embodiments described above have been in terms of a UMTS FDD system, the present invention is not restricted to use in such a system and may be applied in a wide range of systems, for example including TDD (Time Division Duplex).

In practice the amount of data transmitted before BS selection is performed again may be more than one packet, depending on the system overheads of changing the transmitting BS.

In the embodiments described above each data packet is transmitted to the MS 110 from one BS at a time. However, it may be advantageous in some circumstances for the same packet to be transmitted simultaneously from more than one BS. For example, in a situation where three BSs 100*a*, 100*b*, 100*c* are under closed loop power control, if two of the BSs provide an equally good link quality, preferably with similar transmit powers, the data packet or packets may be transmitted concurrently from those two base stations (in a similar manner to transmissions during soft handover).

In a variation on the embodiments described above, there could be more than one data link between a primary and a secondary station. For example, the invention could be applied to the transfer of logical channels between radio links at different frequencies even if they are between the same pair of stations.

The description above related to a BS 100*a*, 100*b*, 100*c* performing a variety of roles relating to the present invention. In practice these tasks may be the responsibility of a variety of parts of the fixed infrastructure, for example in a "Node B", which is the part of the fixed infrastructure directly interfacing with a MS 110, or at a high level in the Radio Network Controller (RNC). In this specification, the use of the term "base station" or "primary station" should therefore be understood to include the parts of the network fixed infrastructure involved in an embodiment of the present invention.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A radio communication system comprising a primary station having means for transmitting a series of data packets to a secondary station, wherein the secondary station has means for determining whether each packet is received correctly and means for signaling this determination to the primary station, and the primary station has means for transmitting error correction information relating to a data packet which the secondary station has not received correctly to assist the secondary station in decoding that packet, means for transmitting the series of data packets via a plurality of logical channels, wherein transmission of data packets on at least one channel of the plurality of logical channels is continued while error correction information is transmitted on another channel of the plurality of logical channels, and handover means for transferring transmission of at least two channels of the plurality logical channels to another primary station, wherein the handover means comprises means for transferring each of the at least two channels individually to another primary station in response to receiving acknowledgement of successful reception of the most recently-transmitted packet on one of the at least two channels, regardless of the status of the other plurality of logical channels.

2. A system as claimed in claim 1, wherein the error correction information comprises a retransmission of the data packet not received correctly.

3. A system as claimed in claim 1, wherein the error correction information enables the secondary station to employ an incremental redundancy scheme.

4. A primary station having means for transmitting a series of data packets to a secondary station, means for determining from signals transmitted by the secondary station whether each packet is received correctly, means for transmitting error correction information relating to a data packet which the secondary station has not received correctly to assist the secondary station in decoding that packet, means for transmitting the series of data packets via a plurality of logical channels, wherein transmission of data packets on at least one channel of the plurality of logical channels is continued while error correction information is transmitted on another channel of the plurality of logical channels, and handover means for transferring transmission of at least two channels of the plurality of logical channels to another primary station, wherein the handover means comprises means for transferring each of the at least two channels individually to another primary station in response to receiving acknowledgement of successful reception of the most recently-transmitted packet on one of the at least two channels, regardless of the status of the other plurality of logical channels.

5. A primary station as claimed in claim 4, wherein all of the logical channels are transferred to another primary station.

6. A secondary station having means for receiving a series of data packets from a primary station, means for determining whether each packet is received correctly and means for signaling this determination to the primary station, means for receiving from the primary station error correction information relating to a data packet which the secondary station has not received correctly to assist the secondary station in decoding that packet, means for receiving the series of data packets via a plurality of logical channels, wherein reception of data packets on at least one channel of the plurality of logical channels is continued while error correction information is transmitted on another channel of the plurality of logical channels, and handover means for starting to receive at least two channels of the plurality of logical channels from another primary station, each of the at least two channels being transferred from the primary station to another primary station in response to acknowledgement by the secondary station of successful reception of the most recently-transmitted packet on one of the at least two logical channels, regardless of the status of the other plurality of logical channels.

7. A secondary station as claimed in claim 6, further comprising site selection means for selecting at least one primary station from a plurality of available primary stations for the transmission of subsequent data packets to the secondary station.

8. A method of operating a radio communication system comprising a primary station arranged to transmit a series of data packets to a secondary station, the method comprising the secondary station determining whether each packet is received correctly and signaling this determination to the primary station, and the primary station transmitting error correction information relating to a data packet which the secondary station has not received correctly to assist the secondary station in decoding that packet, transmitting the series of data packets via a plurality of logical channels, wherein transmission of data packets on at least one channel of the plurality of logical channels is continued while error correction information is transmitted on another channel of the plurality of logical channels, and being able to transfer transmission of at least two channels of the plurality of logical channels to another primary station, wherein each of the at least two channels may be transferred individually to another primary station in response to receiving acknowledgement of successful reception of the most recently-transmitted packet on one of the at least two channels, regardless of the status of the other plurality of logical channels.

9. A method as claimed in claim 8, wherein the primary station is configured to transfer each logical channel to the same other primary station.

* * * * *